(12) United States Patent
d'Hondt

(10) Patent No.: US 6,360,803 B1
(45) Date of Patent: Mar. 26, 2002

(54) LAMINATOR

(75) Inventor: Arnold August Petronella Marie d'Hondt, Boxmeer (NL)

(73) Assignee: Texmach B.V. (NL)

( * ) Notice: Subject to any disclaimer, the term of this patent is extended or adjusted under 35 U.S.C. 154(b) by 0 days.

(21) Appl. No.: 09/444,287

(22) Filed: Nov. 19, 1999

(51) Int. Cl.⁷ ............................. B30B 5/04; B30B 15/34
(52) U.S. Cl. ...................... 156/499; 156/555; 156/582; 156/583.5
(58) Field of Search ................................. 156/499, 555, 156/580, 582, 583.1, 583.5; 100/327, 151, 153, 155 R, 160, 176

(56) References Cited

U.S. PATENT DOCUMENTS

| | | | |
|---|---|---|---|
| 3,823,047 A | | 7/1974 | Colombo ..................... 156/322 |
| 3,923,583 A | * | 12/1975 | Bianchini ..................... 156/378 |
| 4,287,017 A | * | 9/1981 | Lopata et al. ............. 156/583.5 |
| 4,647,332 A | * | 3/1987 | Ranger ........................ 156/285 |
| 4,659,425 A | * | 4/1987 | Eggers et al. ................ 156/630 |
| 4,744,854 A | * | 5/1988 | Schenz ........................ 156/498 |
| 4,826,555 A | * | 5/1989 | Long ........................... 156/324 |
| 5,167,978 A | * | 12/1992 | Gersbeck ..................... 425/373 |
| 5,463,946 A | * | 11/1995 | Kruger et al. ........... 100/93 RP |
| 5,527,422 A | | 6/1996 | Lehmann et al. ............ 156/555 |
| 5,695,599 A | * | 12/1997 | Pankoke ...................... 156/555 |
| 6,171,429 B1 | * | 1/2001 | Aindow et al. ............. 156/234 |
| 6,200,409 B1 | * | 3/2001 | Tanaka et al. ............ 156/309.9 |

FOREIGN PATENT DOCUMENTS

| | | |
|---|---|---|
| DE | 349203 | 3/1979 |
| DE | 4240285 | 6/1993 |
| DE | 4208812 | 9/1993 |
| FR | 1417500 | 2/1966 |
| GB | 1073566 | 6/1967 |
| GB | 1342962 | 1/1974 |
| GB | 2218040 | 11/1989 |
| NL | 7015947 | 7/1971 |

\* cited by examiner

Primary Examiner—James Sells
(74) Attorney, Agent, or Firm—Webb Ziesenheim Logsdon Orkin & Hanson, P.C.

(57) ABSTRACT

A laminating device includes two pressure rollers pressed toward each other and together defining a pinch and a first feed mechanism for guiding to the pinch a strip of a flexible first substrate provided with a thermally-activated glue layer. The first feed mechanism includes a first heater for heating the first substrate with the glue layer. The laminating device also includes a second feed mechanism for guiding a flexible second substrate to the pinch such that this second substrate and the glue layer are pressed against each other by the pressure rollers. The laminating device also includes a second heater placed in the zone of the pinch upstream thereof for heating the first substrate with the glue layer heated by the first heater and the second substrate immediately prior to the joining together thereof in the pinch, such that a laminate is formed including two substrates mutually connected by the glue layer.

12 Claims, 1 Drawing Sheet

LAMINATOR

BACKGROUND OF THE INVENTION

The invention relates to the assembly of flexible substrates, for instance strips of substrates which are unwound from respective supply rolls and mutually connected by means of glue, to form a laminate by a laminating process.

The invention relates particularly to a laminating process wherein at least one of the substrates comprises a foam layer. A laminate manufactured on the basis thereof is for instance used in the car industry for covering seats or the like.

Known is a method which is known as "flame lamination", wherein isocyanate, halogens, phosphorus-based compounds and the like are released. It is an object of the invention to provide a laminating device is which does not have this drawback and is therefore considerably more environmentally-friendly.

It is further known to perform a laminating process with a substrate provided with a foam layer or consisting of a foam layer, wherein as a result of the rather low temperature at which the two substrates are pressed toward each other in the pinch between two pressure rollers the foam layer loses a considerable part of its thickness. Since the thickness is of great importance in the case of the laminates in question, this loss of thickness is perceived as a great drawback, since in practice an excess of foam is used with such a method to obtain laminate which, despite the loss of thickness, still possesses the finally desired thickness. Said excess means the use of more material and higher costs.

SUMMARY OF THE INVENTION

In respect of the above the device provides a laminating device, comprising:

two pressure rollers pressed toward each other and together defining a pinch;

first feed means for guiding to the pinch a strip of a flexible first substrate provided with a thermally-activated glue layer, which first feed means comprise first heating means for heating the first substrate with the glue layer;

second feed means for guiding a flexible second substrate to the pinch such that this second substrate and the glue layer are pressed against each other by the pressure rollers; and second heating means placed in the zone of the pinch upstream thereof for heating the first substrate with the glue layer heated by the first heating means and the second substrate immediately prior to the joining together thereof in the pinch, such that a laminate is formed consisting of two substrates mutually connected by the glue layer.

A steady and very effective preheating of the first substrate together with the glue layer is obtained by making use of a relatively long residence time in the region of the first heating means. It must nevertheless be prevented that these heating means take up too much space. A very practical embodiment has the special feature in this respect that the first heating means comprise a heated roller, around a substantial peripheral part of the outer surface of which the first substrate extends during transport at a relative speed of zero or practically zero. The roller can for instance be heated by thermal oil.

A specific embodiment has the special feature that the glue layer lies directly against the outer surface of the roller. It should be understood in this respect that the glue layer must be thermally activated. This can best take place by means of direct contact with the heat source, in this case the heated roller.

In order to prevent unintended adhesion of the glue layer to the roller use is preferably made of an embodiment in which the outer surface is coated with an anti-adhesion layer, for instance a coating not allowing adhesion to the glue layer, for instance a silicone material, PTFE or the like.

A greatly improved intensity of the activity of the first heating means is realized with an endless belt under tensile stress which extends over at least a part of said peripheral part of the outer surface and presses the first substrate with the glue layer against this outer surface.

In order to prevent problems with adhesion, for instance in the case where the first substrate is relatively porous and the glue softened by heating can penetrate to the other side of the first substrate, use can preferably be made of an embodiment in which the inner surface of the endless belt is coated with an anti-adhesion layer, for instance of silicone material, PTFE or the like.

So as to improve the intensity with which the glue is adhered to the first substrate, use can be made in a preferred embodiment of a third pressure roller which forms a second pinch with the heated roller and which at the end of the contact zone of the first substrate with the glue layer against the heated roller brings the heated and thereby softened glue into intensive contact with the first substrate, such that the glue can penetrate into pores possibly present in this first substrate.

A specific embodiment has the special feature that the second heating means are adapted and disposed to heat by infrared radiation at least the glue layer and the side of the second substrate for placing into contact therewith. Infrared radiation is generally very practical and can herein be dosed extremely well, for instance by adjusting the current flow through an incandescent element and/or adapting the distance of the infrared source relative to the receiving object.

A preferred embodiment has the special feature that the second heating means comprise only one infrared radiator.

Another embodiment has the special feature that the second heating means are adapted and disposed to heat by hot air at least the glue layer and the side of the second substrate for placing into contact therewith. This embodiment has the advantage that the risk of for instance any fire hazard or other disturbances in the case of unintentional standstill of the device is smaller than when infrared technique is used.

A preferred embodiment has the special feature that the residence time of the second substrate in the region of the second heating means and the energy density are chosen such that the second substrate is heated to a temperature of about 140° C. Thus is achieved that the two layers for placing into mutual contact have roughly the same temperature in the region of the pinch. This enhances a rapid and completely reliable adhesion.

A specific embodiment of the latter principle has the special feature that the residence time of the second substrate in the region of the second heating means amounts to about 0.5–2 s and the energy density amounts to about 7–25 kW/m².

As is known, efforts are increasingly being made to make materials reusable or embody them such that they can be easily separated from other materials for specifically adapted destruction. In this respect the laminator according to the invention can be embodied such that the substrates and the glue layer are based on materials chosen such that the laminate has substantially the character of a mono-material.

Applying of the glue to the first substrate can take place in different ways. The substrate can be already provided beforehand with a thermoplastic glue layer, although the laminator according to the invention can also be provided with means for applying such a glue layer. Mentioned by way of example are solvent-free spraying, applying a coating via an extrusion gap, powder-spraying and screen-coating.

Depending on the nature of the laminate for manufacture, a density of for instance 1–150 g/m² can be used.

The processing speed of the laminator according to the invention depends on the technical requirements of a user. Speeds up to about 100 m/min. are easy to realize.

In respect of the width of the substrates and the final laminate, values in the order of a few meters, for instance 6 meters, can for instance be envisaged.

BRIEF DESCRIPTION OF THE DRAWING

The sole FIGURE is a side view of a laminating device in accordance with the present invention.

DESCRIPTION OF THE PREFERRED EMBODIMENTS

Figure 1:
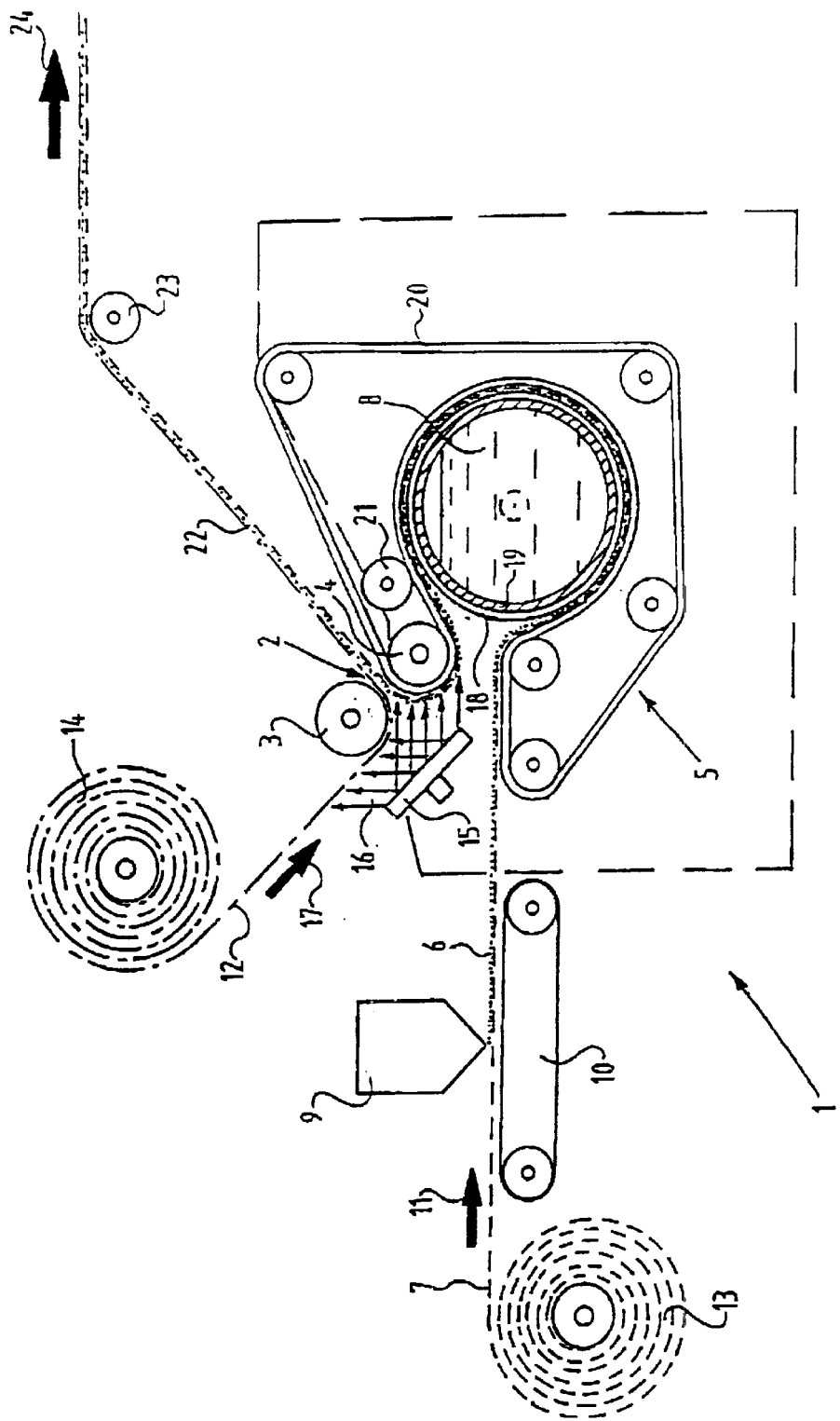

The drawing shows a laminating device 1. This laminating device comprises two pressure rollers 3,4 which are pressed toward each other and together define a pinch 2. The device further comprises first feed means 5 for guiding toward the pinch a strip of a flexible first substrate 7 provided with a thermally-activated glue layer 6, which first feed means comprise a roller 8 heated by thermal oil for heating the first substrate 7 with glue layer 6. Glue layer 6 is applied in the form of a coating on first substrate 7 by making use of a glue application station 9. Situated in the region of the station 9 is an endless conveyor 10 which, if desired, supports first substrate 7 from station 9 together with glue layer 6 during transport as according to arrow 11 to first feed means 5

Device 1 further comprises second feed means for guiding a flexible second substrate 12 to the pinch such that this second substrate 12 and glue layer 6 are pressed against each other by pressure rollers 3,4.

First substrate 7 is unwound from a supply roll 13. second substrate 12 is unwound from a supply roll 14. A source 15 of infrared radiation 16 heats the second substrate, which is fed as according to arrow 17, and glue layer 6 at least in the region directly upstream of pinch 2, as designated with the relevant arrows.

The roller 8 is provided with a PTFE coating 18 so as to prevent adhesion of the outer surface 19 of roller 8 to glue layer 6.

As shown in the drawing, the combination of first substrate and glue layer 6 extends over a substantial part of the periphery of the outer surface 19 of roller 8. The intensity of the heat transfer from roller 8 to glue layer 6 and thereby substrate 7 is enhanced by making use of an endless belt 20 which is under tensile stress and extends over at least a substantial part of said peripheral part of the outer surface 19 and thus presses first substrate 7 with glue layer 6 against the PTFE coating 18 of outer surface 19.

As shown in the drawing, the endless pressing belt 20 is guided over a number of rollers, including pressure roller 4. In order to prevent the problem of belt 20 adhering to substrate 7 with glue layer 6, the surface of belt 20 coming into contact therewith is also provided with a coating not allowing adhesion, for instance PTFE or a silicone material.

A gradual heating takes place along the peripheral part over which the second substrate 7 with glue layer 6 lies against roller 8, for instance to a temperature of some tens of degrees below the final processing temperature, i.e. for instance 150° C. The glue must be able to display a substantial softening at the end of this contact zone. A third pressure roller 21 pressed toward roller 8 presses with some force via pressure belt 20 against the combination with second substrate 7 and glue layer 6 still situated in contact with roller 8. The pinch between pressure roller 21 and heating roller 8 thus causes an effective improvement in the intensity with which glue layer 6 is adhered to or penetrates into the pores of the first substrate 7.

Directly upstream of pinch 2 the already preheated combination of first substrate 7 with glue layer 6 is further preheated by the infrared radiation 16 and is then joined together under pressure with the second substrate 12, which is likewise heated by infrared radiation 16. The thus resulting laminate 22 can cool for a few seconds to below the softening temperature of the glue and is subsequently guided further as according to arrow 24 via a deflecting roller 23, for instance For processing or winding onto a supply roll (not shown).

Attention is finally drawn to the fact that it could be observed that a significant part of the described problems according to the prior art could be avoided by making use of a pressure-sensitive glue layer instead of a thermally-activated glue layer. Heat-activated glues, however, are generally of better quality than pressure-sensitive glue types. These latter have the further drawback that a relatively large quantity thereof is required. It will thus be apparent that by making use of the heat-activated glue type a qualitatively very high-grade laminate can be obtained with the device according to the invention at a price which is lower than that which can be obtained with pressure-sensitive glue types.

What is claimed is:

1. A laminating, device, comprising:
   two pressure rollers pressed toward each other and together defining a pinch;
   a first feed means for guiding to the pinch a strip of a flexible first substrate provided with a thermally-activated glue layer, which first feed means includes a first heating means for heating the first substrate with the glue layer and wherein the glue layer lies directly against the outer surface of the roller;
   a second feed means for guiding a flexible second substrate to the pinch such that this second substrate and the glue layer are pressed against each other by the pressure rollers; and
   a second heating means placed in the zone of the pinch upstream thereof for heating the first substrate with the glue layer heated by the first heating means and the second substrate immediately prior to the joining together thereof in the pinch, such that a laminate is formed that has two substrates mutually connected by the glue layer.

2. The laminating device as claimed in claim 1, wherein the first heating means includes a heated roller, around a substantial peripheral part of the outer surface of which the first substrate extends during transport at a relative speed of about zero.

3. The laminating device as claimed in claim 2, wherein the outer surface is coated with an anti-adhesion layer.

4. The laminating device as claimed in claim 2, further including an endless belt under tensile stress which extends over at least a part of said peripheral part of the outer surface and which presses the first substrate with the glue layer against this outer surface.

5. The laminating device as claimed in claim 4, wherein the inner surface of the endless belt is coated with an anti-adhesion layer.

6. The laminating device as claimed in claim 2, further including a third pressure roller which forms a second pinch with the heated roller and which at the end of the contact zone of the first substrate with the glue layer against the heated roller brings the heated and thereby softened glue into intensive contact with the first substrate, such that the glue can penetrate into pores possibly present in this first substrate.

7. The laminating device as claimed in claim 1, wherein the second heating means are adapted and disposed to heat by infrared radiation at least the glue layer and the side of the second substrate for placing into contact therewith.

8. The laminating device as claimed in claim 1, wherein the second heating means includes only one infrared radiator.

9. The laminating device as claimed in claim 1, wherein the second heating means are adapted and disposed to heat by hot air at least the glue layer and the side of the second substrate for placing into contact therewith.

10. The laminating device as claimed in claim 7, wherein the residence time of the second substrate in the region of the second heating means and the energy density are chosen such that the second substrate is heated to a temperature of about 140° C.

11. The laminating device as claimed in claim 10, wherein the residence time of the second substrate in the region of the second heating means amounts to about 0.5–2 s and the energy density amounts to about 7–25 $kW/m^2$.

12. The laminating device as claimed in claim 1, wherein the substrates and the glue layer are based on materials chosen such that the laminate has substantially the character of a mono-material.

* * * * *

UNITED STATES PATENT AND TRADEMARK OFFICE
CERTIFICATE OF CORRECTION

PATENT NO. : 6,360,803 B1
DATED : March 26, 2002
INVENTOR(S) : Arnold A.P.M. d'Hondt It is certified that error appears in the above-identified patent and that said Letters Patent is hereby corrected as shown below:

Title page,
Item [30], Foreign Application Priority Data, insert
-- Nov. 20, 1998   (NL)    1010620 --.

Column 3,
Line 41, "second" should read -- Second --.

Column 4,
Line 20, "For" should read -- for --.

Signed and Sealed this

Seventeenth Day of September, 2002

Attest:

Attesting Officer

JAMES E. ROGAN
Director of the United States Patent and Trademark Office